March 15, 1960  S. W. WILCOX  2,928,177
MECHANICAL INDICATING AND PLOTTING DEVICE
Filed May 29, 1953  2 Sheets-Sheet 1
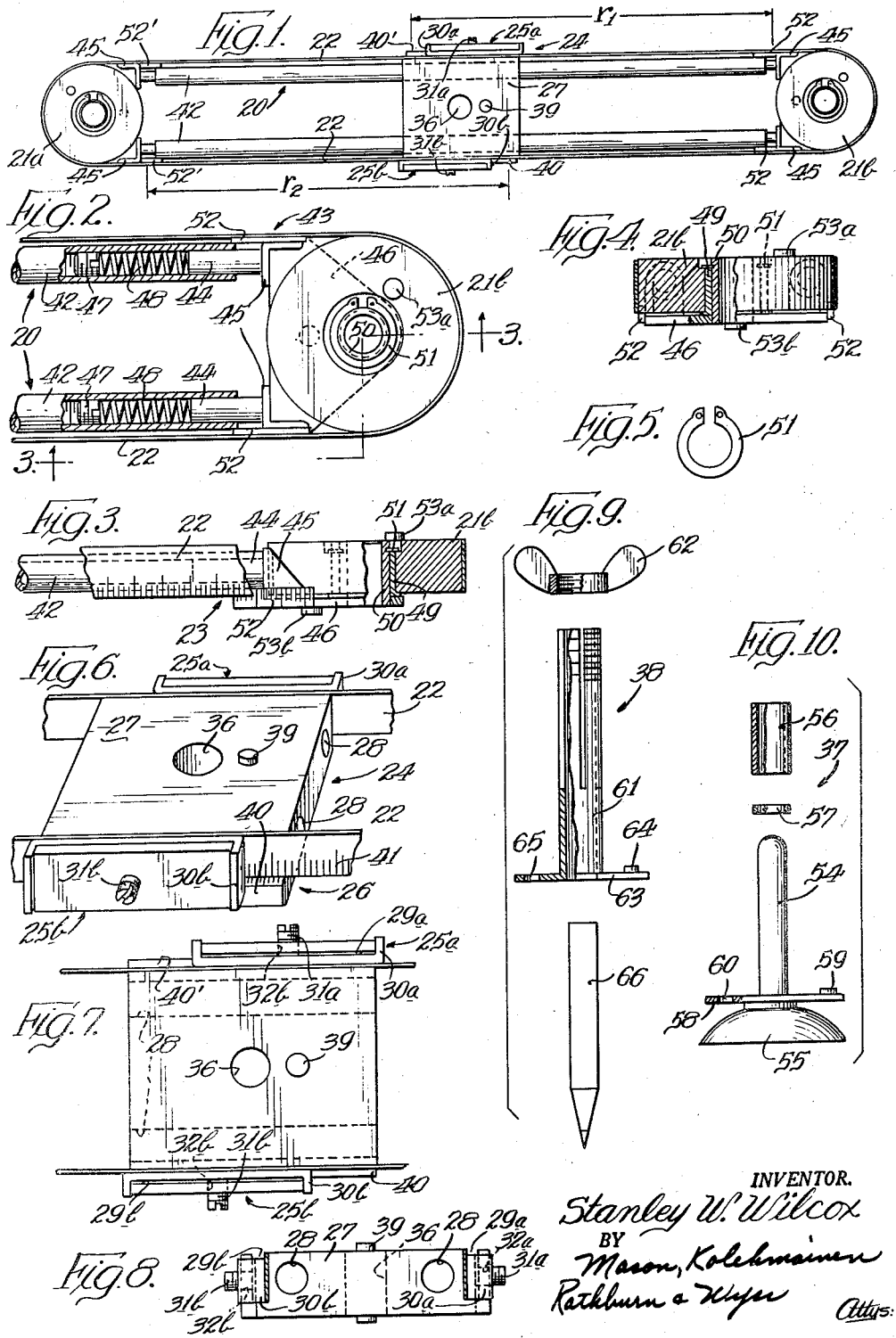
INVENTOR.
Stanley W. Wilcox
BY
Mason, Kolehmainen,
Rathburn & Wyss
Attys.

March 15, 1960 S. W. WILCOX 2,928,177
MECHANICAL INDICATING AND PLOTTING DEVICE
Filed May 29, 1953 2 Sheets-Sheet 2
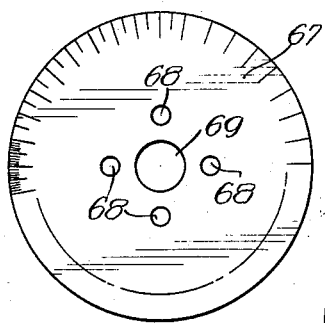
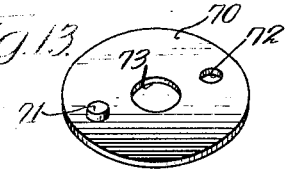
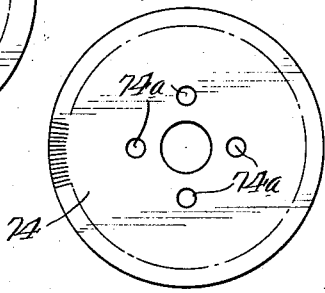
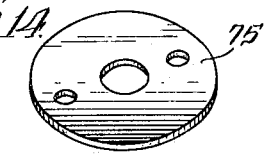
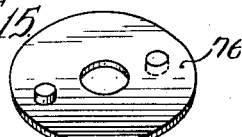
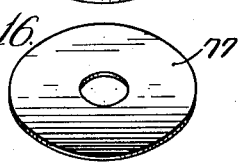
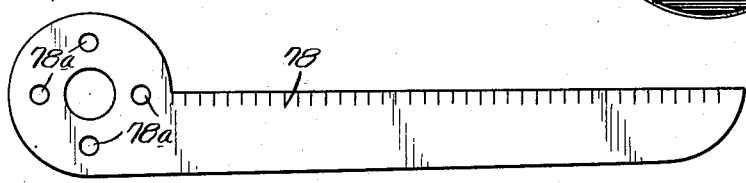
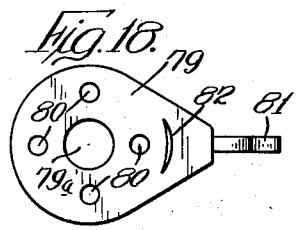
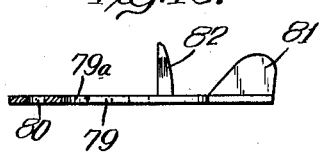
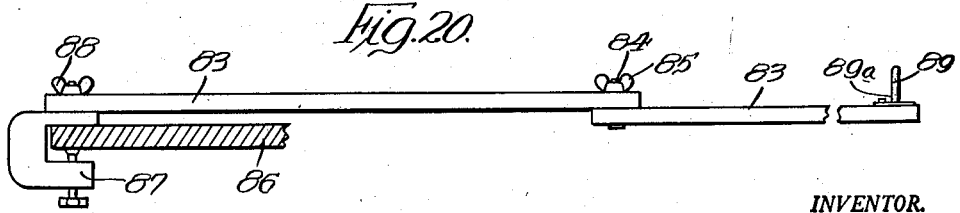
INVENTOR.
Stanley W. Wilcox
BY
Mason, Kolehmainen, Rathburn & Wyss
Attys:

United States Patent Office 2,928,177
Patented Mar. 15, 1960

2,928,177

MECHANICAL INDICATING AND PLOTTING DEVICE

Stanley W. Wilcox, Tulsa, Okla., assignor to Seismograph Service Corporation, Tulsa, Okla., a corporation of Delaware Application May 29, 1953, Serial No. 358,227

40 Claims. (Cl. 33—27)

This invention relates to mechanical indicating and plotting devices and more particularly to a mechanical tool for performing a plurality of mathematical, geometric and drafting functions.

The mechanical tool of the present invention, when used with a few basic attachments, is capable of producing a large variety of geometric configurations, and is capable of providing useful information to aid the solution of a number of mathematical problems. A device of this nature has a number of inherent uses as an aid to instruction in the fields of plain geometry, analytic geometry, trigonometry, basic drafting, and the like. While these uses of the mechanical plotter when used as a single unit with basic attachments are of considerable importance, the use of a number of identical mechanical devices in tandem whereby the indications and functions of each of the units supplements those of other identical units, presents even greater possibilities. The structural interconnection of a number of such units to produce a great variety of useful results is disclosed and claimed in my copending application Serial No. 358,228 filed concurrently herewith and assigned to the same assignee as the present invention, and, for that reason, the description is herein limited to a single mechanical plotter and the results attainable by proper use of such a plotter.

It is an object of the present invention to provide a mechanical plotting device which may be utilized to produce a number of geometric configurations.

Another object is to provide an apparatus for performing a variety of geometric transformations in which indicating means are so provided that these transformations will conform to predetermined geometric conditions.

A further object is to provide a mathematical plotter and marking means in which the angular rotation of the plotter and the linear movement of the marking means may be simultaneously indicated.

A still further object is to provide a mechanical plotter employing a positioner and a marking device in which rotation of the plotter causes simultaneous movement of the marking means with respect to the positioner in a predetermined direction.

Still another object of the invention is to provide a mechanical plotter in which an endless movable tape interconnects a pair of rotatable wheels in order that relative movement between the endless tape and the rotatable wheels may be indicated in order to produce a number of predetermined geometric configurations.

Another object is to provide a mechanical plotter in which an endless tape passes through a sliding member and interconnects a pair of rotatable members and in which means are provided to selectively permit free and unrelated movement between the tape and the sliding member.

Another object is to provide a device of the character described in which the sliding member may be freely movable with respect to the tape, may be clamped to the tape to move only in a predetermined direction, or may be utilized to lock the tape to prevent movement in any direction.

Another object is to provide an indicating and marking device in which an endless tape interconnects a plurality of rotatable members and in which a sliding member may be selectively secured to said tape at any of a plurality of predetermined positions in order to control the relative movement between a marker and a positioner secured to the plotter, and for providing a means for indicating the movement of said slidable member with respect to said rotatable members in order to produce a series of predetermined geometric configurations.

In accordance with the present invention, the foregoing and other objects of the invention are realized by providing a mechanical plotting unit which essentially comprises a frame provided with a plurality of parallel spreader rods having a wheel rotatably mounted at each end thereof. Around each of the wheels passes a continuous flexible metallic tape of constant length which is provided with a linear scale on its surface for providing an indication of the movement of the tape over the wheels. The spreader rod also carries a slider assembly which is provided with a plurality of clamping means thereon so that the slider may be clamped to the tape at any of a number of predetermined positions on either side of the spreader bars. The slider assembly is provided with a vernier scale in registry with the linear scale on the endless tape in order that the slider assembly may be selectively clamped at any desired position along the tape or, in the event that free movement of the slider assembly is desired, to provide an indication of the relative movement between the tape and the assembly.

A tracer and a positioning member are provided as separate attachments for the plotter in order that they may be selectively secured either to the slider assembly, to the frame member or to one of the wheels positioned on the frame. The functions which the mechanical plotter will perform depend upon the positions selected for attachment of the tracer and the positioning member, and upon the position at which the slider assembly is clamped to the endless tape. By proper selection of these variables, the mechanical plotter when employed singly may be utilized to perform such functions as the production of a family of circles with self-determining radii, the generation of a spiral of Archimedes, the production of a linear scale, the tracing of a single hypocycloid, the demonstration of polar coordinates and the production of straight lines having determinable angular relationships.

Other objects and many of the attendant advantages of this invention will be readily appreciated as the same becomes better understood by reference to the following detailed description when considered in connection with the accompanying drawings wherein:

Fig. 1 is a plan view of a mechanical plotting device which is one embodiment of the invention;

Fig. 2 illustrates an enlarged plan view of a broken away portion of the device shown in Fig. 1 showing the details of the arbor for mounting the wheel assembly on the frame of the mechanical plotter;

Fig. 3 is a partial sectional view taken along a line substantially corresponding to line 3—3 of Fig. 2;

Fig. 4 shows a partial sectional view looking endwise of the wheel assembly shown in Fig. 2;

Fig. 5 illustrates one type of holder which may be employed to hold the bearings of the wheel assembly of Fig. 4 in position;

Fig. 6 is an enlarged perspective view of the slider bar assembly of the plotter shown in Fig. 1 and shows the endless metallic tape passing therethrough;

Fig. 7 is a plan view of the slider bar assembly shown in Fig. 6;

Fig. 8 is an end view of the slider bar assembly shown in Fig. 6;

Fig. 9 shows an exploded view of the assembly apparatus for attaching a marking device to the mechanical plotter;

Fig. 10 is an exploded view of the assembly apparatus for attaching a positioner to the plotter of Fig. 1;

Fig. 11 shows a protractor circle disc which may be attached to the wheel assembly of the plotter;

Fig. 12 illustrates a vernier plate which is designed to match the calibrations on the protractor disc of Fig. 11;

Figs. 13 to 16 illustrate a plurality of assembly washers which may be useful in assembling the mechanical plotter;

Fig. 17 shows a straight edge attachment which may be secured to the mechanical plotter;

Fig. 18 is a plan view of a rotatable plate which may be attached to the plotter;

Fig. 19 shows a front elevation view of the rotatable plate of Fig. 18; and

Fig. 20 illustrates extender arms and apparatus for mounting the plotter on a conventional drafting board.

Referring now to the drawings, wherein like reference characters designate like or corresponding parts throughout the several views, there is shown in Fig. 1 a mechanical plotter which includes a frame or arm member indicated generally as 20 and having rotatable assemblies or members 21a and 21b mounted at the extreme ends thereof. Interconnecting the rotatable assemblies so as to be movable over their outer periphery is a continuous flexible metallic tape 22. An indicating scale designated as 23 and shown in Fig. 3 may be comprised of separate graduated scales positioned respectively on the metallic tape and the frame member 20 in order to provide an indication of the travel of the tape over the rotatable assembly.

Slidably positioned on the frame 20 for linear movement in a predetermined direction between the rotatable members is a sliding assembly or cross member 24, through which the endless tape passes at two positions on opposite sides on the frame. The sliding assembly may be clamped to the endless tape at either of the two positions, and at any desired point along the length of the tape, by means of a pair of clamping devices 25a and 25b. When the sliding assembly is clamped to the tape at only one of the positions, the sliding assembly is moved along the frame 20 in a pretermined direction upon movement of the endless tape 22 by rotation of one of the rotatable members. An indicating means 26 which is comprised of cooperating scales positioned on the sliding assembly 24 and on the endless tape 22 provides an indication of the relative movement between the sliding assembly and the tape to enable the sliding assembly to be clamped at any desired and indicated position along the tape.

As shown in Figs. 6, 7 and 8, the sliding assembly 24 includes a block 27 having a pair of longitudinal bores 28 therethrough for mounting the block on the frame 20. The endless tape 22 passes through a pair of longitudinal slots 29a and 29b on opposite sides of the block 27 in order that the clamping means 25a and 25b, which are also positioned in the longitudinal slots, may clamp the block 27 to the endless tape at either of the slotted positions. The clamping means 25a and 25b each include a brake shoe, designated respectively as 30a and 30b positioned respectively in the longitudinal slots 29a and 29b. Threaded lugs 31a and 31b which engage with internally threaded apertures 32a and 32b, respectively, in the portion of the block forming the longitudinal slots 29a and 29b cooperate with the brake shoes to enable the block to be clamped to the tape. Insertion of one of the threaded lugs into the threaded aperture forces the brake shoe into contact with the metallic tape 22 and thereby clamps the sliding assembly to the tape whereby rotation of one of the rotatable members causes movement of the sliding assembly 24 along the frame 20 in a predetermined direction. For instance, let it be assumed that it is desired to move the sliding assembly as viewed in Fig. 1 from the position shown to the right towards the rotatable assembly 21b when the rotatable assembly is rotated in a clockwise direction as viewed in Fig. 1. The clamping means 25a are actuated by tightening the lug 31a until the brake shoe 30a clamps the sliding assembly to the endless tape as the tape passes through the longitudinal slot 29a. Rotation of the assembly 21b in a clockwise direction moves the endless tape thereover and the movement of the endless tape, in turn, induces linear movement of the sliding assembly along the frame 20 towards the rotatable assembly 21b. It is manifest that rotation of the rotatable assembly 21b in a counterclockwise direction with the sliding assembly clamped at the position just described will cause the sliding assembly to move to the left as viewed in Fig. 1, toward the rotatable assembly 21a. This reverse movement of the sliding assembly, that is, movement toward the assembly 21a, may also be effected by clamping the block 27 to the steel tape by means of the clamping means 25b after first releasing the locking pressure of the clamping means 25a on the flexible tape 22. Hence, it can be seen that movement of the sliding assembly 24 in either of two predetermined directions along the frame 20 is attainable by proper manipulation of the clamping means 25a and 25b so that the sliding assembly is moved in either of these two directions upon rotation of either of the rotatable members. Simultaneous application of pressure through the clamping means 25a and the clamping means 25b locks the sliding assembly to the tape at two positions on opposite sides of the frame so that movement of the tape over the rotatable members is thereby prohibited. If neither of the clamping means is actuated, free and unrelated movement between the tape and the sliding assembly is provided. A small indentation 35 in the surface of the brake shoe accommodates a rounded end of the threaded lug in order to aid in the application of locking pressure to the endless tape 22, and to prevent the withdrawal of the brake shoe from the tape unless the lug has first been removed. A transverse opening 36 may be provided in the block 27 in order to receive an atachment 37 shown in Fig. 10 for positioning the mechanical plotter with respect to a drafting board or the like, or for receiving a marking attachment 38 shown in Fig. 9, in a manner to be subsequently described in detail. A projecting pin 39 may be provided on the upper surface of the block 27 in order to register with openings in a washer, another mechanical plotter or other suitable attachments in a manner which will become fully evident hereinafter.

The indicating means 26 comprises vernier scales 40 and 40' attached to opposite sides of the blocks 27 in registry with a graduated scale 41 on the tape 22 in order to indicate accurately the position of the center of the opening 36 with respect to the metallic tape so that the sliding assembly 24 may be accurately located at any desired position along the tape 22 by reference to the indicating means. The vernier plates 40 and 40' are offset from the bore-hole center by a predetermined amount so that the reading of the indicating means 26 accurately portrays the position of the slide on the frame 27 and permits an indication of the movement of the tape in a manner to be subsequently described in detail. It now becomes apparent that the clamping means 25a and 25b may be utilized to lock the sliding assembly to the tape at any accurately measured position as indicated on the scale 26.

Referring now to Fig. 2, it can be seen that the frame 20 includes a pair of parallel spreader rods 42 at each end of which is positioned an arbor assembly 43 for rotatably mounting the wheel assembly 21a or 21b on the frame. The spreader rods 42 are in the form of tubes, each end of which telescopes over a stud 44 which is secured to a bracket 45 on a segmental end plate 46 of the arbor assembly. Threadedly inserted into the end of each of the spreader rods is an adjusting plug 47 which may be inserted to any desired position in an internally threaded end portion of the rod in order to adjust the pressure on a compression spring 48 positioned within the end of the rod between the end of the stud 44 and the head of the plug 47. Tension on the tape 22 may be adjusted by varying the pressure of the springs 48 on each of the arbor assemblies 43, which variation is accomplished by altering the depth of the adjustable plug 47 in the spreader rod. Application of manual pressure to either of the arbor assemblies compresses the spring 48, relieves the tension on the tape 22 and permits the tape to be slipped off of the wheels 21a or 21b to enable assembly or disassembly of the mechanical plotter.

Secured to the plate 46 so as to rotatably mount an anti-friction sleeve bearing 49 is a thimble journal 50 which is in the form of a hollow cylinder encompassed by the sleeve 49. To maintain the bearing sleeve in position and hold the wheel on the journal 50 a snap ring 51, preferably of the type shown in Fig. 5, may be provided in abutment with the sleeve 49 and encircling the cylindrical journal 50. If a precision instrument is desired, preloaded, anti-friction ball bearing assemblies may be substituted for the hollow sleeve bearing 49 in order to increase the accuracy of the device and reduce friction.

The indicating means 23 comprises vernier scales 52 and 52' secured to the brackets 45 of the wheel assemblies 21a and 21b and in registry with the graduated scale 41 on the endless tape 22. The vernier scales 52' and 52 are offset from the center of the wheel assemblies 21a 21b, respectively, by a distance which corresponds to the zero-point offset distance of the scales 40 and 40' attached to the sliding assembly 24. The tape 22 may be set to zero by moving the tape with the clamps 25a and 25b released until tape zero registers with the zero point on the vernier scales 40 and 40' and the offset of these scales and of the scales 52 and 52' enables a direct reading of the tape distance between scales 40' and 52 and 40 and 52' which is indicative of the distance between wheel assembly centers and the center of the sliding assembly. As shown in Fig. 1, a reading of the tape measurement differences at the vernier scale 40' and the scale 52 measures the distance $r_1$ whereas the difference in tape readings observed at vernier scale 40 and scale 52' measures the distance $r_2$. By actuating one of the clamping means 25a or 25b one of the vernier scales 40 or 40' is clamped in fixed position with respect to the tape 22 while the reading on the unclamped vernier scales indicates an apparent movement of the tape which is twice the distance of movement of the sliding assembly along the frame. The double distance indication is induced by the movement of the sliding assembly in one direction along the frame and the simultaneous movement of the tape in an opposite direction through the sliding assembly. The actual tape movement is therefore one-half of the scale reading at the vernier and the values of $r_1$ and $r_2$ may consequently be ascertained with twice the accuracy of conventional direct indicating vernier scales. The purpose of the setting up of the mechanical plotter in this manner is to establish a relationship between the transverse movement of the slider and the rotational motion of the wheel assemblies and to display quantitively these movements. In this manner, precise indicating means is available for accurately positioning the tape 22 with respect to the wheel assembly 21a or 21b and for indicating the relative movement of the tape over the wheel.

To facilitate the assembly and disassembly of the mechanical plotter and its attachments, an assembly pin 53a may be provided on the upper face of each of the wheel assemblies 21a and 21b. These pins are identical in size and shape to the pin 39 positioned on the sliding assembly 24, and, like pin 39, register with suitable apertures in assembly apparatus which is secured to the plotter in a manner to be subsequently described in detail.

In order to provide a means for attaching the frame 20 to other assembly apparatus, the bottom surface of the supporting plate 46 may be provided with a downwardly protruding pin 53b, the purposes of which will become evident as the description proceeds.

The inner diameter of the hollow cylindrical journal 50 is equal to the diameter of the opening 36 in the sliding assembly so that the attachments 37 and 38 may be interchangeably inserted into these openings. The attachment 37 includes a positioning stub 54 to which is secured a suction cup 55 or other suitable positioning means which may be selectively attached at any desired position on a drafting board, a drawing paper, or the like. The positioning stub may be selectively inserted into either the opening 36 in the sliding assembly 24 or the central opening in the journal 50 in order to accurately locate the plotter with respect to any fixed position. Spacer sleeves 56 and 57 may be utilized to adjust the height of the plotter if such is required or the space the positioning attachment with respect to other attachments. Although only one of each of the spacers 56 and 57 is shown in Fig. 10, it is to be understood that a plurality of such members are provided so that as many spacers as needed in assembling the plotter are available.

The stub 54 may be provided with a washer 58 having an assembly pin 59 and an assembly aperture 60 thereon for registering with a corresponding aperture or pin on the apparatus to which the positioning attachment 37 is attached.

For many purposes, a positioning attachment of the type previously described is not feasible and, hence, a different means for establishing a fixed point is desirable. For this reason, a point establishing means of the type shown in Fig. 20 may be substituted for the attachment 37 and, consequently, it will be understood that further reference to the positioner 37 includes both of these general types. The positioner of Fig. 20 includes a pair of positioning arms 83 pivoted about a junction bolt 84 to which locking pressure may be applied by the wing lock nut 85 to lock the arms in position. The arms may be secured to a drafting board 86, or the like, by means of a clamp 87 about which the arms are pivoted. A lock nut 88 may be provided to lock one of the positioning arms to the clamp. On the outer extremity of the positioning arm is preferably mounted a screw-in positioning pin 89 which may be attached directly to the clamp 87 in the event that the positioning arms are not necessary. The positioning pin may be provided with an attaching washer 89a which is identical to the washer 58 on the positioning attachment 37.

The marking attachment 38 includes a sleeve assembly bolt 61 which is selectively insertable into either the opening 36 in the sliding assembly or into the central opening in the thimble journal 50 and which is retainable therein by a wing nut 62 threadedly attached to the bolt. A washer 63 may be secured to the bolt 61 in order that an assembly pin 64 and an assembly aperture 65 of the washer may register with an accommodating aperture or pin in the apparatus to which the bolt is attached. A further use for the central opening in the journal is to permit the insertion of a cross hair or alignment scope (not shown) or for the insertion of a pin point locating device in order to align accurately the center of the opening over a fixed point. A marker 66, which may be a marking pen or pencil as shown in Fig. 9 or may be a scriber or other suitable marking means, is insertable into the hollow of the sleeve assembly bolt 61 so that the marker may be positioned either on the sliding assembly 24 or on one of the wheel assemblies 21a or 21b.

Although only one sleeve bolt 61 is shown in Fig. 10, actually a plurality of such bolts of varying length are provided to facilitate the assembly of the apparatus. A protractor circular disc 67 of the type shown in Fig. 11, one side of which is provided with peripheral graduations calibrated in degrees and the other side of which is provided with peripheral graduations corresponding to the linear calibrations 41 on the endless tape 22, may be secured to the wheel assembly 21 for rotation therewith.

In assembling the wheel and protractor disc an assembly aperture 68 may be placed in registry with one of the assembly pins on the apparatus to which the disc is attached such as the pin 59 on the washer 58 or the pin 64 on the washer 63. A central opening 69 in the protractor disc then fits over one of the attachments 37 or 38 so that the protractor is fixed with respect to the attachment while the wheel 21a or 21b is free to rotate. If desired, the disc 67 may be made rotatable with the wheel by utilizing a washer 70 of the type shown in Fig. 13 in which a pin 71 on the washer inserts within the aperture 68 in the disc and an aperture 72 in the washer receives one of the pins 53a or 53b on the wheel. A central opening 73 in the washer receives either of the attachments 37 or 38 when the disc is locked to the wheel assembly by engagement of the pins and apertures.

A vernier plate 74, one side of which is provided with a vernier scale graduated in degrees to correspond to the scale on one side of the disc 67 and the other side of which is graduated in linear divisions to match the linear scale on the other side of the disc 67, may be attached to the wheel assembly by means of the assembly apertures 74a in a manner identical to the assembly of the disc 67. By proper selection of the washers shown in Figs. 13 to 16 in order to register the necessary pins and apertures in a manner similar to the assembly of the disc 67, the vernier plate 74 may be non-rotatably assembled on the arbor assembly 43 or may be mounted on the wheel assembly to rotate therewith.

A washer 75, illustrated in Fig. 14 and having two apertures therein, is provided for simultaneous registry with two different pins. Such a washer is useful in locking together two surfaces having protruding assembly pins such as the washer 58 and the wheel assembly 21.

A washer 76, as shown in Fig. 15, is provided with two protruding pins for simultaneously registering with two apertures in order to lock together the attachments having the apertures. Such a washer might be useful in locking the vernier plate and protractor disc together. A washer 77 of oilite or prelubricated metal as illustrated in Fig. 16 is used when freely movable fixtures are desired. Actually, several of each of these types of washers are provided since more than one washer of a particular type may be required in one assembly.

The washers illustrated are merely one acceptable means for providing free movement or fixed movement between the plotting unit and the attachments mounted thereon. The pins and holes may be tapered to take up play between adjacent washers and increase the accuracy of the plotter. An alternative means for providing the fixed or free movement between assembled parts of the apparatus could be achieved by employing male and female washers having interlocking gear teeth.

A straight edge 78 having assembly apertures 78a as shown in Fig. 17 may be attached to one of the wheel assemblies 21a or 21b and by proper selection of washers the straight edge may selectively be made rotatable with the wheel assembly 21, may fixedly be mounted on the arbor assembly, or may be rotatable freely with respect to both the wheel assembly and the arbor assembly. With the straight edge attached, the plotter is useful as a linear scale in drawing lines at various angles such as might be employed in shading or other drafting work or in other applications where the production of straight lines at predetermined angles is desirable.

When the straight edge is used with the plotter, the vernier plate 74 and the protractor disc 67 may also be assembled on the wheel assembly 21 so that the angular rotation of the straight edge about the thimble bearing 50 may be indicated accurately on the protractor disc 67 in cooperation with the vernier scale. It is apparent that this indication may be provided either by fixedly mounting the vernier plate on the arbor assembly and mounting the protractor disc for rotation with the straight edge or by fixedly mounting the protractor disc and mounting the vernier plate for rotation with the straight edge. The fixedly mounted scale, either on the vernier plate or the protractor disc, provides a fixed starting point from which relative angular rotation between the disc and the plate may be read by reference to the peripheral indicator scale on the protractor disc. The straight edge may be set to any desired angle by reading the indicator scale so that the straight edge may be used for the production of straight lines at the desired angle.

If the angular position between a pair of lines is unknown and it is desired to measure that angle, the straight edge may be aligned with one of the lines and the protractor disc set to zero. Rotation of the straight edge into alignment with the other of the lines provides an indication on the degree scale of the protractor disc of the angle between the lines which may be read by means of the cooperating vernier scale on the vernier plate 74. Other uses for a device which measures angles and aids in the accurate establishment of points and lines at predetermined angles will be obvious to those skilled in the art.

Another apparent use for the plotter is the provision of a linear scale for measuring the distance between two fixed points. To effect this measurement the positioning attachment 37 is positioned near one of the points and one of the wheel assemblies is mounted on the positioning attachment. The marker or indicator 38 is attached to the sliding assembly 24 and the marker is then moved to one of the known points. The indicator scale 26 is set to zero by applying hand pressure to the wheel to compress the spring 48 and permit the tape to be moved until the zero point of the tape scale 41 is aligned with the vernier scale 40 to 40'. The pressure is then released and the sliding assembly 24 is clamped to the tape at only one position. The marker is then moved to the second point thereby moving the tape over the outer periphery of the wheel for a distance exactly equal to the distance between the points. This distance is indicated on the indicator scale 26 by a measurement which is twice the distance between the points due to the aforementioned movement of the tape through the opposite vernier scale 40 or 40' simultaneously with the linear movement of the slide along the frame.

It should also be noted that when the protractor disc 67 and the vernier plate 74 are assembled on the wheel 21a or 21b the graduations of the protractor 67 correspond to the graduated scale 41 on the tape in order that the transverse linear movement of the slider assembly 24 may be converted into the angular rotation of the wheel in radians. When the tape is moved a distance equal to the radius of the wheel, the wheel is rotated one radian and the measurement of the movement of the tape over the wheel as provided by the protractor 67 and scale 41 thereby provides an indication of wheel rotation in radians.

To facilitate the rotation and movement of the assembled plotter and to facilitate the measurement referred to in the preceding paragraph, a rotating plate attachment 79 may be provided having a central opening 79a which is insertable over the positioning stub 54 or the sleeve bolt 61 in order to mount the plate on the wheel assembly. Assembly apertures 80 are provided in the plate for engagement with suitably shaped pins in the manner heretofore described in assembling the plate on the wheel assembly. The plate 79 may be provided with a finger grip 81 at its outer extremity which permits facile rotation of the plotter when the plate 75 is fixedly secured to the wheel assembly 21. A vernier scale 82 may be provided on the plate 79 to aid in reading the graduated scale 41 on the metallic tape with which it is in registry as well as the graduations on the discs 67 and 74. Thus, the plate attachment 79 may be fixed to the frame with the disc 67 or 74 mounted for rotation with one of the wheels whereupon the scale 82 overlies the graduated scale 41 and the gradautions on the discs and permits the transformation of the linear movement of the slide into radians as discussed in the preceding paragraph. This measurement may be made by aligning the zero marks on the scale 41 and the protractor 67 with the vernier 82 and reading the final indications after the plotter has been turned or operated.

If it is desired to draw a circle of any predetermined radius, the positioning attachment 37 may be attached to the wheel assembly and fixedly located at the center of the circle to be produced so that the plotter is rotatable about the positioning attachment. The sliding assembly 24 may be moved to the predetermined radius as indicated by the vernier scale 40 or 40' on the sliding assembly in cooperation with the graduated scale 41 on the tape to measure the radius $r_1$ or $r_2$ in the manner heretofore described. The sliding assembly is clamped to the tape at two positions by simultaneous application of clamping pressure through the clamping means 25a and 25b in the manner previously described so that there is no relative movement between the tape and the wheel assembly. Insertion of the marking attachment 38 at the slider assembly and rotation of the wheel assembly about the thimble journal 50 causes the marker to transcribe a circle of predetermined radius. Obviously the radius may be set at any position along the tape so that a family of circles of self-determining radii may thereby be produced.

The plotter may be used to simulate a spiral of Archimedes by positioning the positioning attachment 37, which is inserted in the wheel assembly, at the center of the spiral. Suitable washers are assembled on the positioning attachment 37 to hold the wheel assembly in fixed position so that it does not rotate when the frame is turned. The sliding assembly 24 is clamped to the tape 22 at only one position, which position may preferably be adjacent the wheel assembly 21a or 21b in which the positioning attachment is inserted. The marker attachment 38 is attached to the sliding assembly 24 and the frame 20 is then rotated about the wheel assembly carrying the positioning attachment 37 in order to move the marker attachment. Obviously, as the frame 20 is rotated, the slide 24 is moved along the frame by the movement of the tape 22 over the wheel assemblies inasmuch as the tape is clamped at only one position. Movement of the tape over the wheel assembly causes the sliding assembly to be moved along the frame 20 away from the wheel assembly so that the marker attached to the sliding assembly is simultaneously moved linearly along the frame and rotatably about the positioning attachment 37 as the plotter is turned. It is obvious that the resultant of this combined movement is a spiral, the center of which is located at the positioning attachment 37 and the pitch of which is determined by the diameter of the wheel since the linear movement of the marker during one complete rotation of the plotter is equal to the circumference of the wheel. With each complete rotation of the plotter, the endless tape is moved over the wheel for a distance equal to the circumference of the wheel and, hence, the marker which is moved with the tape is moved an equal distance.

The plotter is also a useful device for demonstrating polar coordinates when the wheel assembly 21 of the plotter and the positioning attachment 37 inserted therein are positioned at the pole or origin of the polar coordinate plotting system. The protractor disc 67 and the vernier plate 74 are assembled on the wheel assembly using suitable washers and cooperating pins or apertures so that the vernier plate is rotatable with the wheel assembly 21 and the protractor disc is fixed to the positioning attachment 37. The protractor disc is assembled on the stub 54 with the degree scale up so that the pin 59 fits into the aperture 68 in order to fix the protractor disc with respect to the pole or origin. A washer 75 may be inserted on the stub 54 before the protector disc is placed thereon if free motion is desired. The spacer ring 56 may next be placed on the stub and the vernier plate assembled also with the degree side up so that the protractor disc and the vernier plate are contiguous. A washer 76 is next placed on the stub with one pin in registry with an aperture in the vernier plate and the sleeve bolt 61 of selected length is then locked to the washer 76 and consequently to the vernier plate 74 by registry between the other pin on the washer 76 and the aperture 65. Another washer 75 is then applied over the bolt and the wheel assembly 21 of the plotter placed thereover so that the plotter is rotatable about the sleeve 61. The angular rotation of the plotter is displayed on the protractor disc scale in cooperation with the vernier scale on the vernier plate in order that the angular orientation of the plotter with respect to the drawing board or paper is thereby indicated. The assembly is completed by adding an additional washer 75 and the wing nut 62.

To provide a direct indication of the vectorial angle of the polar coordinate system on the protractor disc indicating scale, the plotter is aligned with the initial line of the polar coordinate system and the angular scale leading between the vernier plate scale and the protractor disc scale is set to zero. Tightening the wing nut 62 orients the protractor disc in this zero position so that any subsequent rotation of the plotter in a counterclockwise direction is a direct measure of the vectorial angle of the polar coordinate system.

To provide a direct reading of the vectorial radius of the polar coordinate system, the marker 38, which is attached to the sliding assembly 24, is moved to a position closely adjacent the wheel assembly 21 at the origin of the polar system. The tape 22 is then set to zero by sliding the tape over the wheel assembly 21 after manually compressing the springs 48 until the vernier scale 40 or 40' indicates a zero setting on the graduated scale 41 of the tape. Tightening the wing nut 62 locks the tape in its zero position so that subsequent rotation of the plotter allows the movement of the tape over the wheel assembly to be directly read on the tape scale 41 by means of the vernier scale 40 or 40' as described above. Since the sliding assembly 24 may be moved to any position along the tape, the marker may be moved in accordance with the movement of the plotter and can be made to assume any point in the polar coordinate system. Any position to which the plotter is moved causes simultaneous movement of the tape 22 and rotation of the protractor 67 so that the vectorial radius of the polar system is indicated by the tape reading and the vectorial angle is simultaneously indicated on the protractor disc scale. The protractor 67 turns with the frame of the plotter and the matching vernier plate 74 is fixed with respect to the reference plane of the drawing board as shown in Fig. 20, thereby providing a polar angle between the frame and the drawing board without reference to the rotational position of the wheel. The angular reading of the protractor 67 and the vernier plate 74 is directly indicative of the polar angle of the coordinate system irrespective of the amount of rotation of the wheel assemblies. The vectorial radius may be ascertained from the difference between the vernier scales 40' and 52' or the scales 40 and 52 on the same side of the unit. By reading the scales on the same side of the plotter to obtain the vectorial radius, errors induced by tape slippage over the wheel assemblies are avoided and the accuracy of the radius measurement is thereby increased.

Manifestly, the uses set forth are only a few of those attainable by proper manipulation of the plotter and other functions will be readily perceivable to those skilled in the art.

Obviously many modifications and variations of the present invention are possible in the light of the above teachings. It is therefore to be understood that within the scope of the appended claims the invention may be practiced otherwise than as specifically described and it is intended to cover all modifications within the true spirit and scope of the present invention.

What is claimed as new and desired to be secured by Letters Patent of the United States is:

1. In a mechanical indicating and plotting device, a combination of a frame, a pair of rotatable members mounted on said frame, an endless tape interconnecting said rotatable members for movement thereover, said tape having a graduated scale thereon, a slide carried by said frame and including at least one opening through which said tape passes, an indicating means on said slide in registry with the graduated scale on said tape so as to indicate the relative movement between the tape and the slide, and a pair of indicators carried by said frame at spaced positions respectively adjacent said rotatable members and each registering with the graduations on said tape, whereby one of said indicators displays the distance between said slide and one of said rotatable members while the other of said indicators displays the distance between said slide and the other of said rotatable members.

2. A mechanical indicating and plotting device for use with detachable marking and positioning attachments which comprises a frame, a pair of rotatable members mounted on said frame, an endless tape interconnecting said rotatable members for movement thereover, means for indicating the movement of said tape with respect to said frame, a cross member slidably positioned on said frame and manually movable therealong to any predetermined position, means for indicating the relative movement between the tape and the cross member as said cross member is moved to said predetermined position, means selectively operable to interconnect said cross member and said tape to effect movement of said cross member along said frame as said tape moves over the rotatable members, means for selectively attaching either one of the marking and positioning attachments to one of the rotatable members, and means for selectively attaching the other of said attachments to said cross member.

3. In a plotting device for producing a plurality of geometric configurations, the combination of an elongated frame, rotatable members carried at spaced positions on said frame, an endless tape in the form of a closed loop having at least two tape runs and extending around said rotatable members, a slide carried on said frame and movable to any desired position therealong, said slide including structure defining a pair of spaced tape receiving openings so that each run of said tape passes through one of said openings, a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, and to effect movement of the slide along the frame in a predetermined direction upon rotation of the rotatable members when only one of said clamps is actuated, an indicator carried by said slide in registry with the graduations on said tape for measuring the movement of the slide along said frame when neither one of said clamps is actuated, and a pair of indicating means carried by said frame at spaced positions on opposite sides of said slide respectively adjacent said rotatable members and each registering with the graduations on said tape, whereby one of said indicating means displays the distance between said slide and one of said rotatable members while the other indicating means displays the distance between said slide and the other of said rotatable members.

4. In a plotting device for producing a plurality of geometric configurations, the combination of an elongated frame, rotatable members carried at spaced positions on said frame, an endless tape in the form of a single closed loop interconnecting said rotatable members, whereby the two runs of the tape extend parallel to the frame along opposite sides thereof, a slide carried on said frame and movable to any desired position therealong, said slide including structure defining a pair of spaced tape receiving openings so that each run of said tape passes through one of said openings, a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, and to effect movement of the slide along the frame in a predetermined direction upon rotation of the rotatable members when only one of said clamps is actuated, an indicator carried by said slide in registry with the graduations on said tape for measuring the movement of the slide along said frame when neither one of said clamps is actuated, and a pair of indicating means carried by said frame at spaced positions on opposite sides of said slide respectively adjacent said rotatable members and each registering with the graduations on said tape, whereby one of said indicating means displays the distance between said slide and one of said rotatable members while the other indicating means displays the distance between said slide and the other of said rotatable members.

5. In a plotting device for producing a plurality of geometric configurations, the combination of an elongated frame, a pair of spaced rotatable members carried by said frame, and a tape interconnecting said rotatable members and movable thereover upon rotation of the rotatable members, a scale on said tape including a series of graduations, a slide carried on said frame and manually movable to any desired position therealong, selectively operable means for securing said slide to said tape after said slide has been moved to said desired position in order to effect movement of the slide along the frame between said rotatable members when said rotatable members are rotated, and a pair of indicators carried by said frame at spaced positions respectively adjacent each of said rotatable members and in registry with the graduations on said scale, whereby one of said indicators cooperates with said scale to measure the distance between said slide and a first of said rotatable members while the other indicator cooperates with said scale to measure the distance between said slide and the other rotatable member.

6. In a plotting device for producing a plurality of geometric configurations, the combination of an elongated frame, a pair of spaced rotatable members carried by said frame, a tape interconnecting said rotatable members and movable thereover upon rotation of the rotatable members, a graduated scale on said tape, a slide carried on said frame and manually movable to any desired position therealong, selectively operable means for securing said slide to said tape in order to effect movement of the slide along said frame between said rotatable members when said rotatable members are rotated, an indicating means carried by said slide in registry with said scale for indicating the movement of said slide along said frame whenever the latter is manually moved along the frame, and a pair of indicators carried by said frame at positions respectively adjacent each of said rotatable members and in registry with the graduations on said scale, whereby one of said indicators cooperates with said scale to measure the distance between said slide and a first of said rotatable members while the other indicator cooperates with said scale to measure the distance between said slide and the other rotatable member, said selectively operable means also being operable to permit the manual movement of said slide along said frame.

7. A mechanical plotting device for use with detachable marking and positioning attachments which comprises a frame, at least one rotatable member mounted on said frame, means for detachably mounting said positioning attachment upon one of said rotatable members, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, and a detachable indicating disc mounted for rotation with said rotatable member and having indicating means thereon in registry with said indicator for measuring the rotation of said frame about said positioning attachment.

8. A mechanical plotting device for use with detachable marking and positioning attachments which comprises, a frame, at least one rotatable member mounted on said frame, means for detachably mounting said positioning attachment upon said rotatable member, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, a detachable disc mounted on said rotatable member and having an indicating means thereon in registry with said indicator for measuring the rotation of said frame about said positioning attachment, and means for providing a continuous indication of the position of said slide along said frame.

9. A mechanical plotting device for use with detachable marking and positioning attachments which comprises, a frame, a pair of rotatable members mounted on said frame, a tape interconnecting said rotatable members and movable thereover, means for selectively and detachably mounting said positioning attachment upon one of said rotatable members, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, a scale on said one rotatable member in registry with said indicator for measuring the rotation of said frame about said positioning member, and a plurality of graduations on said tape in registry with the scale on said one rotatable member.

10. A mechanical plotting device for use with detachable marking and positioning attachments which comprises, a frame, a pair of rotatable members mounted on said frame, an endless tape interconnecting said rotatable members and movable thereover, means for selectively and detachably mounting said positioning attachment upon one of said rotatable members, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, a scale on said one rotatable member in registry with said indicator for measuring the rotation of said frame about said positioning member, a series of graduations on said endless tape in registry with the scale on said one rotatable member, and an indicating means carried by said slide in registry with the graduations on said endless tape for indicating the relative movement between said slide and said tape as the slide is moved along the frame to said selected position.

11. A mechanical plotting device for use with detachable marking and positioning attachments which comprises, a frame, a pair of rotatable members mounted on said frame, an endless tape interconnecting said rotatable members, means for selectively and detachably mounting said positioning attachment upon one of said rotatable members, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, a scale on said one rotatable member in registry with said indicator for measuring the rotation of said frame about said positioning member, a series of graduations on said endless tape in registry with the scale on said one rotatable member, and at least one indicating means on said frame in registry with the graduations on said tape for indicating the movement of said slide along said frame as said frame is rotated about said positioning attachment.

12. A mechanical plotting device for use with detachable marking and positioning attachments which comprises, a frame, a pair of rotatable members mounted on said frame, an endless tape interconnecting said rotatable members, means for selectively and detachably mounting said positioning attachment upon one of said rotatable members, means including a slide movable along said frame for detachably mounting the marking attachment at any selected position along said frame, means for controlling the movement of the slide along the frame as said frame is rotated about said positioning attachment in order to induce the marking attachment to produce a predetermined pattern, an indicator on said positioning attachment, a graduated scale on said one rotatable member in registry with said indicator for measuring the rotation of said frame about said positioning attachment, a series of spaced graduations on said endless tape in registry with said scale, an indicator carried by said slide in registry with the graduations on said tape for facilitating the location of said slide at said selected position, and at least one indicator carried by said frame in registry with the graduations on said tape for indicating the movement of said slide along said frame as said frame is rotated about said positioning attachment.

13. In a mechanical indicating and plotting device, the combination of a frame, a pair of rotatable members mounted on said frame, an indicating scale on at least one of said rotatable members including a series of spaced graduations, an endless tape interconnecting said rotatable members and movable thereover, said endless tape having a series of graduations thereon in registry with the graduations on said indicating scale, and an indicator secured in fixed position upon said frame and aligned with the graduations on the endless tape and with the scale in order to facilitate a determination of the relationship between the rotary movement of said one rotatable member and the linear movement of said tape.

14. In a mechanical indicating and plotting device, the combination of a frame, a pair of spaced apart rotatable members mounted on said frame, a disc detachably but fixedly mounted upon at least one of said rotatable members and including an indicating means thereon, an endless tape interconnecting said rotatable members and movable thereover, a series of graduations on said tape in registry with the indicating means on said disc, and an indicator secured in fixed position upon the frame and aligned with both the graduations on the tape and the indicating means on the disc in order to indicate the relationship between the movement of the tape and the rotation of said one rotatable member.

15. In a mechanical indicating and plotting device, the combination of a frame, a pair of spaced apart rotatable members mounted on said frame, a disc detachably but fixedly mounted upon one of said rotatable members and having a series of spaced graduations thereon, an endless tape interconnecting said rotatable members and movable thereover, said endless tape having a series of graduations thereon in registry with the graduations of said indicating scale, and an indicator secured in fixed position upon the frame and aligned with the graduations on both the scale and the tape to indicate the relationship between the rotary movement of said one rotatable member and the linear movement of the tape, the graduations on said disc and on said tape being so dimensioned that they cooperate with the fixed indicator to provide an indication of the angular movement of said one rotatable member in radians.

16. In combination, a pair of attachments; a mechanical plotting device, said device comprising a frame, a pair of rotatable members mounted at opposite ends of the frame, an endless tape interconnecting said rotatable members; a slide movable along said frame, and securing means respectively disposed on said slide, on said frame and on one of said rotatable members, means for selectively attaching one of said attachments to any one of the securing means; means for attaching the other of said attachments to another of said securing means, and a pair of clamping devices on said slide which may be selectively employed to lock said slide to said tape when both of said devices are simultaneously applied, thereby to maintain said slide in fixed position with respect to the frame, to permit independent movement between the slide and tape when both of said devices are released and to produce predetermined movement of said slide along said frame in response to rotation of said rotatable members when only one of said devices is applied.

17. The apparatus defined by claim 16 wherein securing means are provided on each of said rotatable members and a pair of securing means are provided on said frame at positions respectively adjacent each rotatable member.

18. In a mechanical indicating and plotting device, the combination of a frame, a pair of rotatable members mounted on said frame, one of said rotatable members having an indicator thereon, an endless tape interconnecting said rotatable members for movement thereover, said tape having a series of graduations thereon in registry with the graduated scale on said rotatable member, a slide carried by said frame, an indicator on said slide in registry with the series of graduations on said tape so as to indicate the relative movement between the tape and the slide, selectively operable means for clamping said slide at predetermined positions to said tape so that the slide is movable with the tape in a predetermined direction or for simultaneously clamping the slide at a plurality of positions on said tape so as to prevent movement of the tape with respect to rotatable members.

19. A mechanical indicating and plotting device which comprises a frame, a pair of rotatable members mounted on said frame, one of said rotatable members having a graduated scale thereon, an endless tape interconnecting said rotatable members and movable thereover, said tape having a graduated scale thereon in registry with the graduated scale on said one rotatable member, an indicator secured in fixed position upon the frame and aligned with the graduated scales on the tape and on said one rotatable member, a slide carried by said frame, and indicating means on said slide in registry with the graduated scale on said tape for indicating the relative movement between the tape and the slide.

20. A mechanical indicating and plotting device for use with detachable marking and positioning attachments which comprises a frame, a pair of rotatable members mounted on said frame, one of said rotatable members having an indicator thereon, an endless tape interconnecting said rotatable members for movement thereover, said tape having a series of graduations thereon in registry with the graduated scale on said rotatable member, a slide carried on said frame, means for selectively attaching either one of said attachments to either of the rotatable members, and means for selectively attaching the other of said attachments to said slide.

21. The apparatus defined by claim 20 wherein said slide is provided with an indicating means registering with the graduations on the tape to indicate relative movement between the slide and the tape.

22. A mechanical indicating and plotting device for use with a detachable marking attachment and a detachable positioning attachment which comprises a frame, a pair of wheels rotatably mounted at opposite ends of said frame, one of said wheels having an indicator thereon, an endless tape interconnecting said wheels so that the tape moves thereover as the wheels are rotated, said tape having a graduated scale thereon in registry with the indicator and also having a pair of tape runs extending generally longitudinally of the frame, a slide carried on said frame between said wheels, an indicating means on said slide in registry with the graduated scale on the tape for indicating the relative movement between the tape and the slide, a pair of clamping devices on the slide respectively located adjacent each of the tape runs for securing the slide to the tape so that when one of the clamping devices is actuated the slide is moved along said frame in a predetermined direction as said wheels are rotated, said clamping devices when simultaneously actuated preventing movement of said slide along said frame or when simultaneously released, permitting independent movement of the slide and the tape, means for selectively securing either one of the attachments to one of the rotatable members, and means for selectively securing the other of said attachments to the slide.

23. The apparatus defined by claim 22 wherein an indicating means is carried by the frame in registry with the graduations on the tape.

24. In combination, a positioning attachment; a mechanical plotting device comprising an elongated frame, a pair of spaced apart rotatable members carried by said frame, an endless tape interconnecting said rotatable members and moveable thereover, and a slide mounted for movement upon said frame, said slide having a pair of spaced apart clamping means on the slide for selectively securing said slide to said tape; means for detachably mounting said positioning attachment upon one of said rotatable members; a first detachable disc non-rotatably secured to said positioning attachment and having an indicator thereon; and a second detachable disc mounted for rotation with said one rotatable member and having indicating means thereon cooperating with said indicator to provide a measurement of the rotation of said member about the positioning attachment.

25. The apparatus defined by claim 24 wherein said one rotatable member is provided with an axial opening for accommodating said positioning attachment.

26. The apparatus defined by claim 24 wherein the tape is in the form of a single closed loop having a pair of runs extending generally longitudinally of the frame wherein the clamping means are located at positions respectively adjacent the tape runs.

27. The apparatus defined by claim 25 wherein a straight edge attachment is detachably secured to the slide.

28. The apparatus defined by claim 25 wherein the tape is provided with a series of graduations in registry with the indicating means on said second disc.

29. The apparatus defined by claim 28 wherein the slide is provided with an indicator in registry with the graduations on the tape.

30. The apparatus defined by claim 28 wherein the frame is provided with an indicating means in registry with the graduations on said tape.

31. The apparatus defined by claim 29 wherein the frame is provided with a pair of indicating means respectively located adjacent said rotatable members and each registering with the graduations on said tape.

32. A mechanical plotting device comprising a frame; said frame including a pair of end plates, at least one elongated member extending longitudinally of said device, a part on each end plate telescopically associated with said member, and means biasing each of said end plates longitudinally of said member and away from each other; a wheel mounted on each of said end plates; an endless tape in the form of a single closed O-shaped loop having its ends trained over the wheels and having a pair of tape runs extending longitudinally of said frame, said end plates being movable with respect to said member against said biasing means to permit assembly of said tape upon said wheels, a slide mounted for movement longitudinally of said member; and a pair of manually operable clamps carried by said slide at positions respectively adjacent each tape run so that said clamps may be selectively operated to permit movement of the slide independently of the tape when both clamps are free, to prevent movement of the slide when both clamps are actuated and to provide for movement of the slide along the frame in a preselected direction when either one of the clamps is actuated while the other is free.

33. A mechanical plotting device comprising a frame; said frame including a pair of end plates, at least one elongated member extending longitudinally of said device, a part on each end plate telescopically associated with said member, and means biasing each of said end plates longitudinally of said member and away from each other; a wheel mounted on each of said end plates; an endless tape in the form of a single closed loop interconnecting the wheels and having a pair of tape runs extending longitudinally of said frame, said end plates being movable with respect to said member against said biasing means to permit assembly of said tape upon said wheels; a slide mounted for movement longitudinally of said member; a pair of manually operable clamps carried by said slide at positions respectively adjacent each tape run; a detachable attachment; and means for selectively securing said attachment either to said slide, to one of said end plates or to one of the rotatable members.

34. A mechanical plotting device comprising a frame; said frame including a pair of end plates, at least one elongated member extending longitudinally of said device, a part on each end plate telescopically associated with said member, and means biasing each of said end plates longitudinally of said member and away from each other; a wheel mounted on each of said end plates; an endless tape in the form of a single closed loop interconnecting the wheels and having a pair of tape runs extending longitudinally of said frame, said end plates being movable with respect to said member against said biasing means to permit assembly of said tape upon said wheels; a slide mounted for movement longitudinally of said member; a pair of manually operable clamps carried by said slide at positions respectively adjacent each tape run; a detachable attachment; and means for selectively securing said attachment either to said slide, to either one of the rotatable members or to either one of the end plates.

35. In a plotting device for producing a plurality of geometric configurations, the combination of an elongated frame, rotatable members disposed at the opposed ends of said frame, an endless tape in the form of a single closed loop interconnecting said rotatable members and having a pair of runs extending longitudinally of the frame; a slide carried on said frame and movable to any desired position therealong, and a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, to effect movement of the slide along the frame in a predetermined direction upon rotation of the rotatable members when only one of said clamps is actuated; a detachable attachment; and means for selectively securing said attachment either to said slide, to said frame or to one of said rotatable members.

36. In a plotting device for producing a plurality of geometric configurations, the combination of an elongated frame, rotatable members disposed at the opposed ends of said frame, an endless tape in the form of a single closed loop interconnecting said rotatable members and having a pair of runs extending longitudinally of the frame; a slide carried on said frame and movable to any desired position therealong, and a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, to effect movement of the slide along the frame in a predetermined direction upon rotation of the rotatable members when only one of said clamps is actuated; a pair of end plates each carrying one of the rotatable members, an elongated member, means mounting each end plate for movement longitudinally of the elongated member so that the end plates can be moved toward each other to permit assembly of the tape upon the rotatable members, a detachable attachment, and means for selectively securing said attachment either to said slide, to either one of said end plates, or to either one of the rotatable members.

37. In a plotting device for producing a plurality of geometric configurations, the combination of an elongated frame, rotatable members disposed at the opposed ends of said frame, an endless tape in the form of a single closed loop interconnecting said rotatable members and having a pair of runs extending longitudinally of the frame; a slide carried on said frame and movable to any desired position therealong, and a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, to effect movement of the slide along the frame in a predetermined direction upon rotation of the rotatable members when only one of said clamps is actuated, detachable positioning and marking attachments, means for securing one of said attachments to the slide, and means for selectively securing the other of said attachments either to the frame or to one of the rotatable members.

38. In a plotting device for producing a plurality of geometric configurations, the combination of an elongated frame, rotatable members disposed at the opposed ends of said frame, an endless tape in the form of a single closed loop interconnecting said rotatable members and having a pair of runs extending longitudinally of the frame; a slide carried on said frame and movable to any desired position therealong, and a pair of manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, to effect movement of the slide along the frame in a predetermined direction upon rotation of the rotatable members when only one of said clamps is actuated, a pair of end plates each carrying one of the rotatable members, an elongated member, means mounting each end plate for movement longitudinally of the elongated member so that the end plates can be moved toward each other to permit assembly of the tape upon the rotatable members, detachable marking and positioning attachments, means for securing one of the attachments to the slide, and means for selectively securing the other of said attachments to either of said end plates or to either of the rotatable members.

39. In a plotting device, the combination of an elongated frame formed by at least one elongated member supporting a pair of spaced apart end plates at the opposed ends of the frame, a rotatable member disposed on each of said end plates, an endless tape in the form of a single closed O-shaped loop having its ends trained over and tightly engaging said rotatable members and having a pair of runs extending longitudinally of the frame, means mounting each end plate for movement longitudinally of the elongated member so that the end plates can be moved toward each other to permit assembly of the tape upon the rotatable members, a slide carried on said frame and movable to any desired position therealong, and first and second manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither of the clamps is actuated, to effect movement of the slide along the frame in a first predetermined direction upon rotation of the rotatable members when only the first of said clamps is actuated, and to effect movement of the slide along the frame in a second and opposite direction upon rotation of the rotatable members when only the second of said clamps is actuated.

40. In a plotting device, the combination of an elongated frame, rotatable members disposed at the opposed ends of said frame, an endless tape in the form of a single closed O-shaped loop having its ends trained over and tightly engaging said rotatable members and having a pair of runs extending longitudinally of the frame, a slide carried on said frame and movable to any desired position therealong, first and second manually actuated clamps carried by said slide at spaced positions, each of said clamps being located adjacent one run of said tape and each being selectively operable to clamp the slide to the adjacent tape run, thereby to prevent the movement of the slide along the frame when both of said clamps are actuated, to provide for independent movement of the slide and the rotatable members when neither one of the clamps is actuated, to effect movement of the slide along the frame in a first predetermined direction upon rotation of the rotatable members when only the first of said clamps is actuated, and to effect movement of the slide along the frame in a second and opposite direction upon rotation of the rotatable members when only the second of said clamps is actuated, an indicator carried by the slide, a series of graduations on said tape registering with said indicator, a detachable disc secured to one of the rotatable members and including an indicating means registering with the graduations on said tape, and an indicator secured to the frame in registry with the graduations on the tape and with the indicating means on the disc.

References Cited in the file of this patent

UNITED STATES PATENTS

| 1,326,696 | Simmons | Dec. 30, 1919 |
| 2,409,290 | Lipp | Oct. 15, 1946 |
| 2,420,931 | Cooke | May 20, 1947 |
| 2,513,641 | Gray | July 4, 1950 |
| 2,674,042 | Ott | Apr. 6, 1954 |

FOREIGN PATENTS

| 3,102 | Great Britain | 1857 |
| 19,824 | Great Britain | 1890 |
| 366,024 | France | July 17, 1906 |
| 94,040 | Switzerland | June 25, 1919 |
| 438,807 | Germany | Dec. 28, 1926 |
| 686,026 | Germany | Jan. 2, 1940 |